Figure 2:
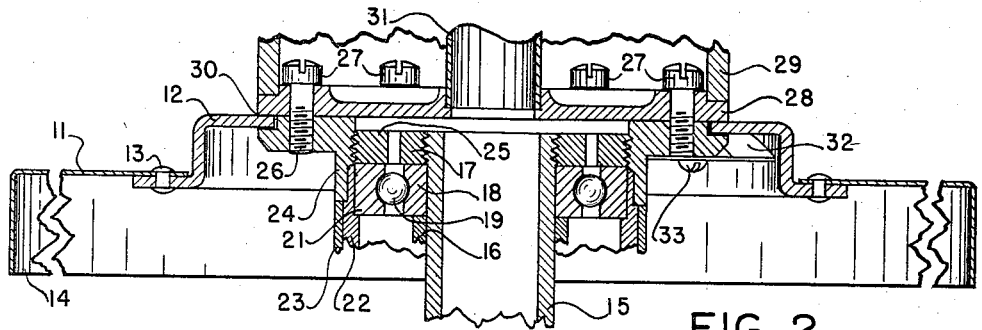

Jan. 13, 1948.  T. C. RIEBE  2,434,369
FRICTION CLUTCH AND DETENT MECHANISM ON INDICATOR DRIVE
Filed Oct. 18, 1943  2 Sheets-Sheet 1

*INVENTOR.*
THEODORE C. RIEBE
BY
Davis, Lindsey, Smith & Shonts,
ATTORNEYS.

Jan. 13, 1948.　　　　T. C. RIEBE　　　　2,434,369
FRICTION CLUTCH AND DETENT MECHANISM ON INDICATOR DRIVE
Filed Oct. 18, 1943　　　　2 Sheets-Sheet 2

*INVENTOR.*
THEODORE C. RIEBE
BY
ATTORNEYS

Patented Jan. 13, 1948

2,434,369

UNITED STATES PATENT OFFICE 2,434,369

FRICTION CLUTCH AND DETENT MECHANISM ON INDICATOR DRIVE

Theodore C. Riebe, Chicago, Ill., assignor to Automatic Electric Laboratories, Inc., Chicago, Ill., a corporation of Delaware Application October 18, 1943, Serial No. 506,686

9 Claims. (Cl. 116—129)

1

The present invention relates to a friction clutch and detent mechanism and, more particularly, to such mechanism arranged to provide for the orientation of a driving member relative to a driven indicator member.

In indicator members such as are used to denote the angular displacement of a member, it frequently is necessary to provide for the orientation of the member being displaced with respect to the indicator member. One such application where this occurs is found in a portable radio direction finder having a loop antenna which must be oriented with respect to north when the direction finder is first set up for operation. In order that all indications of the angular displacement of the antenna be reckoned from north it is necessary to orient the antenna with respect to the indicator. Accordingly the indicator is provided with a notch member which is engageable with a selectively operable detent mechanism so that the indicator may be stopped at a predetermined point, and thereupon the antenna is oriented with respect to north. This orientation of the antenna with respect to north while the indicator is being held fixed at a predetermined point also orients the indicator with respect to the antenna supporting structure. While there are other situations which require similar treatment reference has been made to the portable direction finder in order that the problem and the solution might be readily understood. In accordance with the present invention a selectively operable detent mechanism arrests the movement of an indicator member at a predetermined point and thereupon a novel friction clutch arrangement permits movement of a supporting structure relative to the indicator member.

It therefore is an object of the present invention to provide an improved friction clutch and detent mechanism for orienting a rotatable driving member with respect to a coaxial driven indicator member.

Still another object of the present invention is to provide an improved friction clutch and detent mechanism whereby a driving member may be oriented with respect to a rotatable indicator member and an improved selectively operable detent mechanism is provided for stopping the indicator member at a predetermined position to permit the orientation of one member with respect to the other member.

Figure 1:
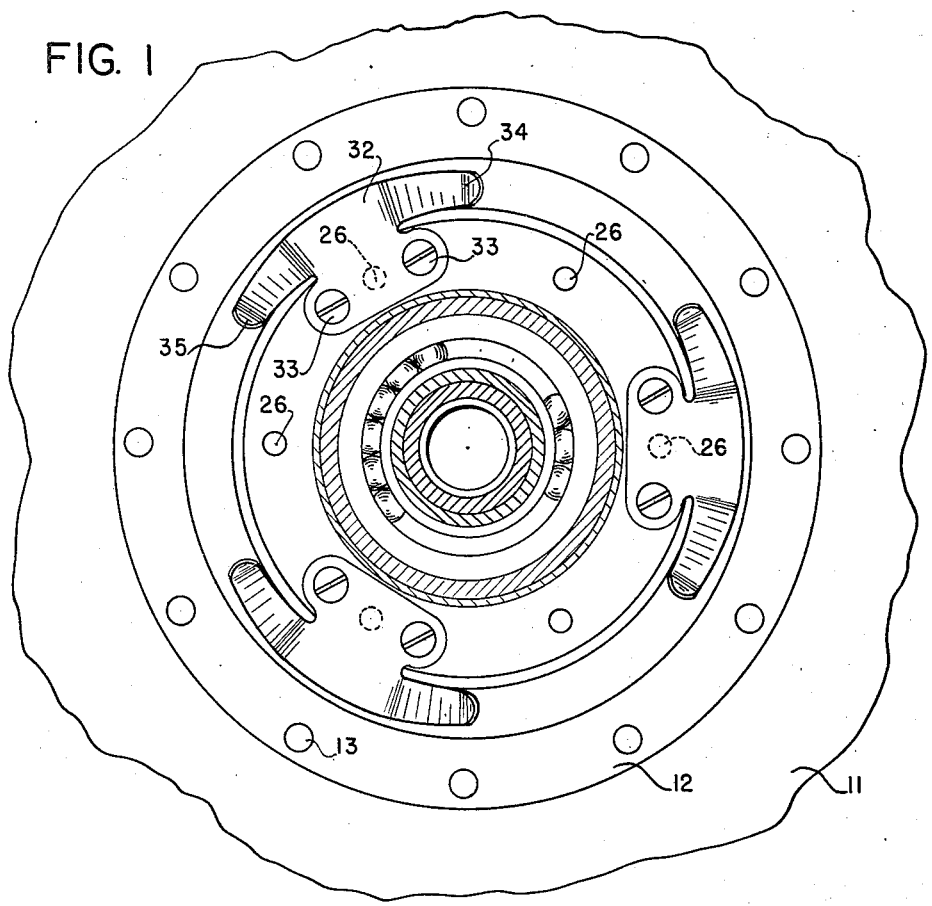
Figure 3:
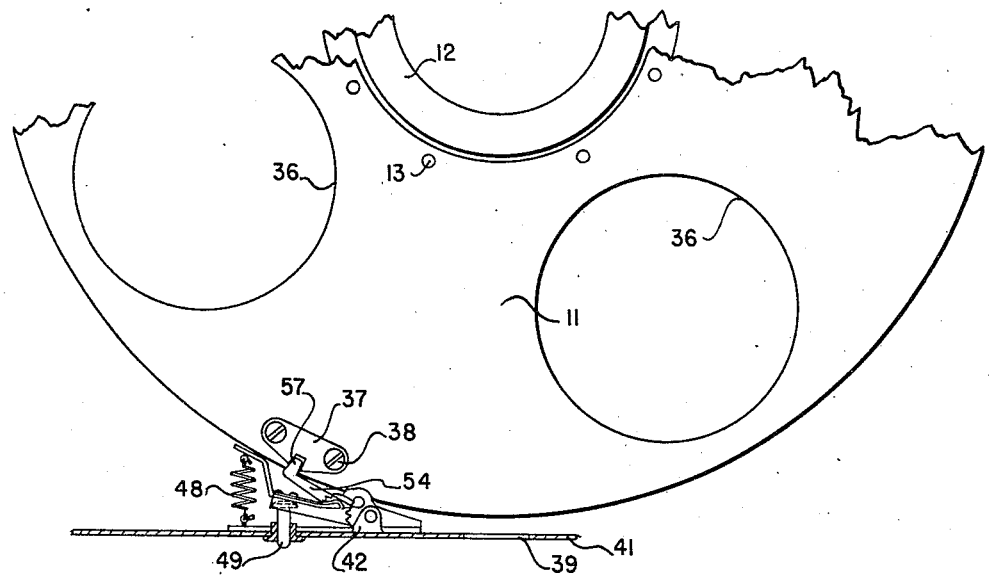
Figure 6:
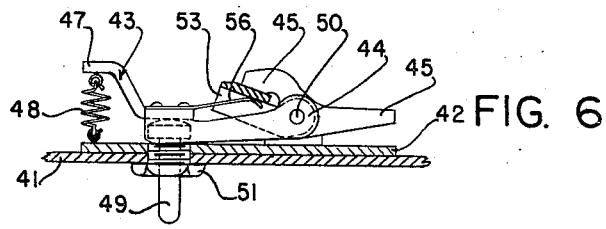
Figure 4:
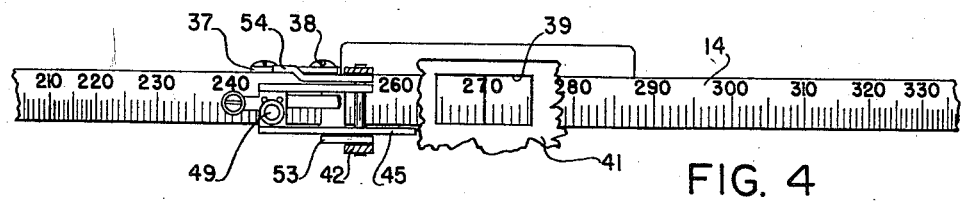
Figure 5:
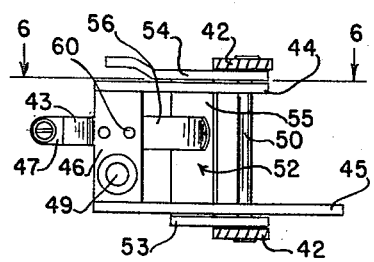

Other and further objects of the present invention subsequently will become apparent and the invention itself is set forth with particularity in the appended claims. The present invention will be readily understood by reference to the following description taken in connection with the accompanying drawings wherein Fig. 1 is a bottom view of a friction clutch arrangement interconnecting a driving member with a driven indicator member; Fig. 2 is a cross-sectional view through the indicator member and the friction clutch mechanism shown in Fig. 1; Fig. 3 is a top view showing the cooperation between a notch provided adjacent the periphery of the indicator member and a selectively operable detent mechanism; Fig. 4 is a front view of the apparatus shown in Fig. 3, wherein the supporting panel and a portion of the supporting bracket of the detent mechanism have been broken away; Fig. 5 is an enlarged view of a portion of the apparatus shown in Fig. 4; and Fig. 6 is a top view along the lines 6—6 of Fig. 5.

Referring more particularly to Figs. 1 and 2, there is shown a portion of the upper surface of a rotatable indicator 11 which is provided with a hub portion 12 secured thereto by a plurality of rivets 13. The outer periphery of the indicator member 11 is provided with a depending portion 14 upon which indicia are inscribed, as may be seen in Fig. 4. The hub portion 12 is cup shaped with a centrally disposed circular opening therein in order to provide an inner peripheral edge portion which is adapted to be frictionally supported in the annular recess 30 formed between the plate 24 and the plate 28 in the manner hereinafter described. The hub 12 is supported by a rotatable supporting structure mounted on a tubular member 15. The tubular member 15 is provided with adjacent portions 16 and 17, the latter being threadedly engaged with the upper extremity of the member 15 to support the inner portion 18 of a ball bearing 19. The outer portion 21 of the ball bearing is engaged by a tubular member 22 supported adjacent another tubular member 23, both of which are secured to a plate member 24. The upper side of the ball race 21 is held in position by a threaded ring 25 which engages a threaded portion on the inside of the plate 24. The plate 24 is provided with a plurality of threaded holes 26 arranged to receive a plurality of cap screws 27 which pass through the cooperating upper plate 28. The upper plate 28 supports an outer tubular member 29 and an inner tubular member 31. The inner and outer tubular members 29 and 31 extend upwardly to support a directional loop antenna system. These tubular members 29 and 31 together with the plates 24 and 28 comprise a driving member for moving the indicator member 11 in accordance with the angular displacement of the loop antenna system. The plate 24 is provided with a recessed portion or step adjacent its periphery so that the inner edge of the cup 12 is supported in an annular groove formed between the plate 24 and the plate 28. The cup or hub portion 12 of the indicator 11 is biased toward one side of the annular groove formed between the plates 28 and 24 by a plurality of spring biasing members 32 which are secured to the underside of the plate 24 by a plurality of cap screws 33. Each of the spring biasing members 32 is provided with two curved fingers 34 and 35 extending in an arcuate direction on either side of the body portion of the spring member 32 so as to engage the inner or under surface of the adjacent cup portion of the hub member 12. The fingers 34 and 35 of the spring member 32 therefore bias the hub portion 12 towards one side of the recess 30 formed between the plate 24 and the plate 28. After the driving member has been oriented with respect to the indicator member the entire assembly extending downwardly from the ball bearings 19 moves as a unit, thereby to provide an indication of the relative displacement of the antenna system supported above the tubular members 29 and 31.

In order to provide for the orientation between the driving member and the driven member, which is the indicator member 11, there is provided a notch and detent mechanism shown in Figs. 3 to 6. From Fig. 3 it will be seen that the indicator member, comprising the portion 11 may be provided with apertures 36 therein to reduce the weight of the indicator member. Adjacent the outer periphery of the indicator member 11 there is secured a notch member 37 by suitable screws or other fastening means 38. The indicia on the depending portion 14 of the indicator 11 are observable through a window 39 in a panel or escutcheon 41. The detent mechanism which cooperates with the notch in the member 37 includes a supporting bracket 42 suitably secured to the panel 41. Interposed between the supporting ears or lugs of the bracket 42 there is a U-shaped member 43 having an upper leg 44 and a somewhat longer lower leg 45 interconnected by an upright strap portion 46. The member 43 is provided with a bent outwardly extending lever portion 47 to which is secured one end of a spring 48, the other end of which is secured to the supporting bracket 42. The member 43 therefore is biased toward the panel 41 and may be actuated away from the panel by a pin 49 mounted in a suitable bearing or grommet 51.

Another double lever U-shaped structure 52 having a lower lever 53 and an upper lever 54 interconnected by a web 55 is also supported between the ears of the bracket 42. A suitable bearing pin 50 is arranged to interconnect the ears of the bracket 42 and the levers 54, 44, 45 and 53. A spring 56 suitably secured, as by rivets 60, to the web portion 46 of the member 43 is arranged to engage the upright web portion 55 of the detent lever mechanism. The upper lever 54 of the detent lever mechanism is provided with a detent portion 57 arranged to engage the notch in the notch plate 37. The spring 56 is arranged to interconnect the actuating lever 43 with the detent lever 52 so that the detent 57 may engage the cam surfaces on either side of the notch formed in the plate 37 as the indicator 11 is being rotated so that it may be stopped by the detent mechanism at a predetermined position. The extended portion of the lower lever 45 of the actuating mechanism 43 is arranged to engage the supporting plate 42, thereby to limit the forward movement of the lever assembly 43.

In the arrangement shown in Figs. 3 to 6 it has been assumed that the indicia appearing through the aperture 39 of the panel 41 is 270° on a 360° indicator scale. This indication appears because it, furthermore, is assumed that a compass is secured to the loop antenna structure at a 90° displacement from the null point in the antenna receptive pattern characteristic. Thus it will be appreciated that the null point is oriented with respect to zero or 180° on the scale provided on the indicator 11. Thus the antenna structure is moved first to cause engagement of the notch plate 37 by the detent 57 through actuation of the button 49. Thereupon further movement of the driving structure associated with the tubular members 29 and 31 is brought about to orient the loop antenna structure with respect to north. When this orientation has been completed pressure on the actuating button 49 is released, whereupon the spring 48 causes the detent 57 to be withdrawn from the notch member 37 and subsequent operation of the loop antenna structure will produce correct indication on scale portion 14 of the indicator member 11.

While one embodiment of the invention has been disclosed, it will be understood that various modifications may be made therein which are within the true spirit and scope of the invention.

What is claimed is:

1. A friction clutch and detent mechanism comprising a driving member, a driven member having indicia adjacent its periphery, stationary sighting means located adjacent the path of travel of said indicia, said members having a common axis of rotation, a portion of said driven member being arranged for frictional engagement with said driving member, a plurality of spring means for biasing said members toward each other, and means including a selectively operable detent arranged to stop said driven member in a predetermined position to permit orientation of said driving member with respect to said driven member.

2. The combination comprising a rotatable driving member, a rotatable driven member having indicia adjacent its periphery, said members having a common vertical axis of rotation, a portion of said driven member being arranged for frictional engagement with said driving member, a plurality of spring fingers for biasing said members toward each other, and means including a selectively operable detent arranged to stop said driven member in a predetermined position to permit orientation of said driving member with respect to said driven member.

3. The combination comprising a rotatable indicator member having indicia on its periphery, a coaxial driving member therefor, said members having coextensive surfaces arranged for frictional engagement with each other, stationary sighting means located adjacent the path of travel of said indicia, means for supporting said coextensive surfaces adjacent each other including a plurality of spring means carried by one of said members and engaging the other of said members to bias said other member toward said first member, said rotatable indicator member being provided adjacent its periphery with a notch, and a selectively operable detent mechanism for stopping said indicator member in a predetermined position for orienting said indicator member with respect to said driving member.

4. The combination comprising a rotatable indicator member having indicia on its periphery, a coaxial driving member therefor, said members having coextensive surfaces arranged for frictional engagement with each other, means for supporting said coextensive surfaces adjacent each other including a plurality of spring means carried by one of said members and engaging the other of said members to bias said other member toward said first member, said rotatable indicator member being provided adjacent its periphery with a notch, and a selectively operable detent mechanism for cooperation with said notch, said detent mechanism including an operating member, a detent lever normally biased away from said indicator member, and a spring interconnecting said lever and said operating member for overcoming the bias of said detent lever when said operating member is actuated whereby said driving member may be oriented with respect to said indicator member.

5. The combination of a rotatable indicator having indicia adjacent its periphery with rotatable means for driving said indicator including means for mounting said indicator and said driving means in frictional relation to each other on a common axis, said means comprising a hub portion for said indicator, said driving means having an annular groove for supporting the hub portion of said indicator, a plurality of spring members for urging said hub portion into frictional driving engagement with one side of said annular groove, said rotatable indicator being provided with a notch, and selectively operable detent means arranged to cooperate with said notch to stop said indicator in a predetermined position to permit orientation of said driving member with respect to said indicator.

6. The combination comprising a rotatable indicator having indicia adjacent its periphery, a coaxial driving member therefor, and means for orienting said indicator with respect to said driving member, said indicator having a hub portion, said driving member having an annular recess for supporting said indicator hub portion, a plurality of spring means interconnecting said indicator hub portion with said driving member, said spring means biasing said hub portion toward one side of said annular recess, said means for orienting said indicator including a selectively operable detent mechanism for stopping said indicator at a predetermined position so that said driving member may be moved relative to said indicator.

7. The combination comprising a horizontal rotatable indicator member having indicia adjacent its periphery, a vertical coaxial driving member therefor, and means for orienting said indicator with respect to said driving member, said indicator being provided with a hub portion, said driving member having an annular recess for supporting said indicator hub portion, a plurality of spring members interconnecting said indicator hub portion with said driving member and biasing said hub portion toward one side of said annular recess, said means for orienting said indicator including a selectively operable detent mechanism operable on the periphery of said indicator to stop said indicator at a predetermined position so that said driving member may be moved relative to said indicator.

8. The combination comprising a rotatable indicator member having indicia adjacent its periphery, a coaxial driving member therefor, said indicator member having a hub portion, said driving member having an annular recess for supporting the hub portion of said indicator, a plurality of spring means interconnecting said indicator hub portion with said driving member to bias said hub portion toward one side of said annular recess, each of said spring means comprising a pair of spring fingers supported from one of said members and engaging the other of said members, and a selectively operable detent mechanism arranged to engage a notch on the periphery of said indicator member to stop said indicator member at a predetermined position so that said driving member may be moved relative to and oriented with respect to said indicator member.

9. The combination comprising a rotatable indicator member having indicia adjacent its periphery, a coaxial driving member therefor, said indicator member having a hub portion, said driving member having an annular recess for supporting the hub portion of said indicator, a plurality of spring means interconnecting said indicator hub portion with said driving member to bias said hub portion toward one side of said annular recess, each of said spring means comprising a pair of spring fingers supported from one of said members and engaging the other of said members, a selectively operable detent mechanism for stopping said indicator member at a predetermined position for orienting said driving member with respect to said indicator, said detent mechanism including a detent normally biased away from the periphery of said indicator member, a detent actuator for said detent comprising a spring lever for urging said detent in a direction for engagement with cooperating means on the periphery of said indicator member, and a notch member provided adjacent the periphery of said indicator for cooperation with said detent.

THEODORE C. RIEBE.

REFERENCES CITED

The following references are of record in the file of this patent:

UNITED STATES PATENTS

| Number | Name | Date |
|---|---|---|
| 2,099,705 | Reichel | Nov. 23, 1937 |
| 1,523,504 | Spiro | Jan. 13, 1925 |